(12) United States Patent
Srivastava et al.

(10) Patent No.: US 9,836,789 B2
(45) Date of Patent: Dec. 5, 2017

(54) METHOD AND SYSTEM FOR GENERATING AND OPERATING HYBRID MARKETS AND USER-DEFINED MARKETPLACES

(71) Applicant: Integral Development Inc., Palo Alto, CA (US)

(72) Inventors: Vikas Srivastava, Palo Alto, CA (US); Patrick Barkhordarian, Los Altos Hills, CA (US); Harpal Sandhu, Palo Alto, CA (US)

(73) Assignee: Integral Development Corporation, Palo Alto, CA (US)

( * ) Notice: Subject to any disclaimer, the term of this patent is extended or adjusted under 35 U.S.C. 154(b) by 0 days.

(21) Appl. No.: 14/214,159

(22) Filed: Mar. 14, 2014

(65) Prior Publication Data

US 2014/0289091 A1 Sep. 25, 2014

Related U.S. Application Data

(60) Provisional application No. 61/801,999, filed on Mar. 15, 2013.

(51) Int. Cl.
*G06Q 40/00* (2012.01)
*G06Q 40/04* (2012.01)

(52) U.S. Cl.
CPC .................. *G06Q 40/04* (2013.01)

(58) Field of Classification Search
USPC ...................................................... 705/36 R
See application file for complete search history.

(56) References Cited

U.S. PATENT DOCUMENTS 7,043,457 B1 * 5/2006 Hansen ............... G06Q 10/087
  705/35
7,827,093 B1   11/2010 May
7,908,199 B2   3/2011 Neff et al.
8,175,955 B2   5/2012 Friesen et al.
(Continued)

OTHER PUBLICATIONS

International Search Report and Written Opinion for PCT/US14/29693 dated Oct. 2, 2014.

*Primary Examiner* — Olabode Akintola
(74) *Attorney, Agent, or Firm* — Artegis Law Group, LLP

(57) ABSTRACT

A system is provided for facilitating trading of financial instruments, comprising: (i) a requester module configured to obtain request for quotation (RFQ) information from one or more requesting users, the RFQ information comprising terms of a request for quotation; (ii) a responder module operatively connected to the requester module, the responder module configured to obtain response information from one or more responding users; (iii) a contract generation module operatively connected to the requester module and the responder module, wherein the contract generation module is configured to generate contracts to trade financial instruments based on the RFQ information and the response information; (iii) an interface module operatively connected to the requester module, the responder module, and the contract generation model, wherein the interface module is configured obtain order information based on the contracts trade financial instruments, from one or more qualifying users; and (iv) a transaction module configured to execute trades based on the contracts to trade financial instruments.

16 Claims, 3 Drawing Sheets

(56) References Cited

U.S. PATENT DOCUMENTS

| | | | |
|---|---|---|---|
| 8,306,892 B1 | 11/2012 | Gross et al. | |
| 8,335,746 B2 | 12/2012 | Burchetta et al. | |
| 8,533,090 B2 * | 9/2013 | Peterffy | G06Q 40/06 705/36 R |
| 2002/0072987 A1 * | 6/2002 | Knudsen | G06Q 30/02 705/26.4 |
| 2006/0026090 A1 * | 2/2006 | Balabon | G06Q 40/04 705/37 |
| 2010/0005030 A1 | 1/2010 | DePetris et al. | |
| 2010/0017220 A1 * | 1/2010 | Lowenstein | G06Q 40/02 705/1.1 |
| 2012/0197779 A1 | 8/2012 | Studnitzer | |

* cited by examiner

METHOD AND SYSTEM FOR GENERATING AND OPERATING HYBRID MARKETS AND USER-DEFINED MARKETPLACES

CROSS-REFERENCE TO RELATED APPLICATIONS AND PRIORITY CLAIM

This application claims priority to U.S. provisional patent application No. 61/801,999, entitled "Method, System, and Apparatus for Generating and Operating Hybrid Markets and User-Defined Marketplaces." This application is related to, and incorporates herein in their entirety, the following provisional patent applications, all filed Mar. 15, 2013, having the serial numbers and titles: 61/790,657, "Method, System, and Apparatus for Real-Time Benchmarking;" 61/791,369, "Method, System, and Apparatus for Generating and Facilitating the Application of Trading Algorithms Across a Multi-Source Liquidity Market;" 61/794,585, "Method, System, and Apparatus for Generating and Operating a Swaps Trading Platform;" and 61/801,123, "Method, System, and Apparatus for Calculating and Utilizing Realized Spread in Financial Transactions."

This application is also related to the following applications, which are also incorporated by reference herein in their entirety: (i) U.S. provisional patent application Ser. No. 61/747,698, filed Dec. 31, 2012, titled "Methods and Systems for Facilitating Financial Exchanges Between Liquidity Takers and Liquidity Providers"; (ii) U.S. patent application Ser. No. 12/984,651, filed Jan. 5, 2011, titled "Systems and Methods for Conducting Financial Transactions"; (iii) U.S. patent application Ser. No. 10/911,076, filed Aug. 3, 2004, titled "Systems and Methods of Conducting Financial Transactions"; (iv) U.S. patent application Ser. No. 09/703,198 filed Oct. 31, 2000, titled "System and Method for Conducting Web-Based Financial Transactions in Capital Markets"; (v) U.S. provisional patent application Ser. No. 60/139,113 filed Jun. 14, 1999, titled "System and Method for an XML Vocabulary for Capital Markets"; (vi) U.S. provisional patent application Ser. No. 60/162,873 filed Nov. 1, 1999, titled "Method and Apparatus for Web-Based Management of Financial Risk and Pricing and Trading of Financial Products"; (vii) U.S. patent application Ser. No. 09/593,324 filed Jun. 13, 2000, titled "System and Method for Conducting Web-Based Financial Transactions in Capital Markets," now U.S. Pat. No. 6,347,307; (viii) U.S. provisional patent application Ser. No. 61/035,655 filed Mar. 11, 2008, titled "System and Method for Conducting Web-Based Financial Transactions in Capital Markets"; and (ix) U.S. patent application Ser. No. 12/402,370 filed Mar. 11, 2009, titled "System and Method for Conducting Web-Based Financial Transactions in Capital Markets." Each of the foregoing is assigned to the assignee of the present disclosure.

BACKGROUND

In the past, users were limited to a particular type of market, often selected by a third party, that pre-defined who was permitted to participate, the role of the participant, what types of orders were permitted, how payment was received, the terms of the settlement, and a myriad of additional features of the financial transaction. In many cases, this predefined market was a designated contract market (DCM), the "designation" indicating that it was certified and regulated by the Commodity Futures Trading Commission (CFTC). DCMs operate with a central limit order book (CLOB) for each contract type. A CLOB is a transparent, contemporaneous, and anonymous database of all orders associated with one or more contracts to trade financial instruments. It is transparent because all qualifying users can see all of the trading activity. It is contemporaneous because it updates in close to real time. It is anonymous because the identity of parties to trades are not revealed.

Being a designated contract market (DCM) has many advantages, including margin requirements and clearing. This is particularly advantageous in the regulatory environment anticipated in light of the changes by the CFTC and the Securities and Exchange Commission (SEC) because of the Dodd Frank Act.

However, for many instruments, such as non-deliverable forwards (NDFs), liquidity exists in over-the-counter (OTC) markets, which are not represented by a CLOB. Typical customer demand also covers all business dates rather than merely a few highlighted per year, as in typical systems. OTC markets also raise the problem of how to direct the attention of market participants with thousands of ongoing contracts in the graphical user interface (GUI).

SUMMARY

The instant disclosure relates generally to the generation of platforms for trading financial instruments and, more specifically, to a method and system for generating and operating hybrid markets and user-defined marketplaces.

In one example, the system includes (i) a requester module, configured to obtain request for quotation (RFQ) information from one or more requesting users, where the RFQ information comprises the terms of a request for quotation; (ii) a responder module, which is operatively connected to the requester module and is configured to obtain response information from one or more responding users, in which the response information includes either an acceptance or a proposed modification to one or more of the defined terms of the RFQ information; (iii) a contract generation module, operatively connected to the requester module and the responder module, in which the contract generation module is configured to generate contracts to trade financial instruments, based on the RFQ information and the response information; and (iv) an interface module, operatively connected to the requester module, the responder module, and the contract generation model, and being configured to enable users to observe and participate in active contracts to trade financial instruments.

The method comprises (i) obtaining, via one or more processing units, from one or more requesting users, RFQ information, in which the one or more users define terms of the request for quote information; (ii) obtaining, from one or more responding users, response information, based on the RFQ information, in which the response information comprises either acceptance of or proposed modifications to one of more of the defined terms of the request for quote information; (iii) generating one or more contracts to trade financial instruments, based on the request for quote information and the response information; (iv) obtaining financial instrument trading orders, based on the one or more generated contracts, from qualified users; and (v) facilitating financial instrument trades based on the instrument trading orders.

BRIEF DESCRIPTION OF THE DRAWINGS

Reference will now be made to the accompanying figures and flow diagrams, which are not necessarily drawn to scale, and wherein.

DETAILED DESCRIPTION

Figure 1:
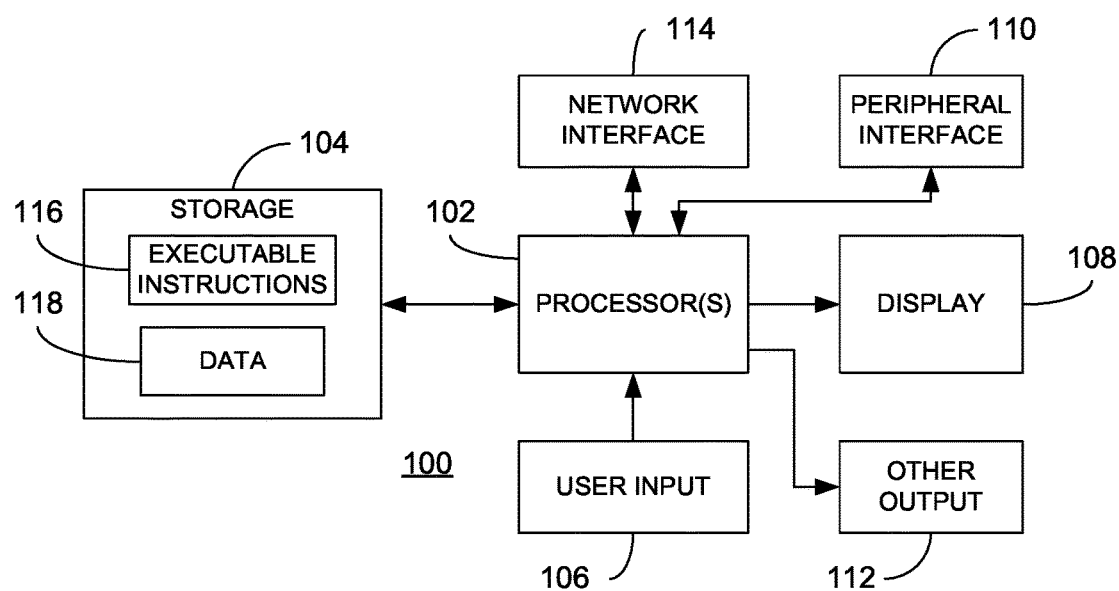
FIG. 1 is a block diagram illustrating one example of a computing device suitable for use in generating and operating hybrid markets and user-defined marketplaces, in accordance with the instant disclosure.

To facilitate an understanding of the principals and features of the disclosed technology, illustrative embodiments are explained below. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Various embodiments of the disclosed technology provide a method and system for generating and operating a hybrid market and a user-defined marketplace.

The instant disclosure relates generally to a method and system allowing users to define all attributes of a market structure related to trading in financial instruments. The methpd and system disclosed herein may advantageously free users from the pre-selected, particular types of market characterized by conventional systems, by providing a method and system for creating a user-defined marketplace whereby the user selects from a number of structural attributes to define the marketplace.

Additionally, the instant disclosure relates to solving the problem of combining the liquidity from OTC markets with liquidity in a central limit order book (CLOB) in a less than liquid instrument/market. The present disclosure addresses the problem by creating a conversational order book in OTC markets to create a hybrid market to bring liquidity from OTC participants into a central limit order book.

The present disclosure applies a template approach using the FXGrid, previously noted in earlier patents and patent applications, incorporated by reference herein, to a variety of financial instruments, trades and transactions to achieve a method and system for creating a user defined marketplace and/or conversational order books to create a hybrid market. This flexibility is achieved through the use of templates, allowing any instrument with liquidity to be traded using the same FXGrid architecture, so that the delivery of any of these types of instruments can be accommodated. Additionally various user interfaces (desktop, mobile, API, click and trade, orders, etc.) can be accommodated within the same FXGrid architecture, creating a system and method that provides for adaptable channels to accommodate the transfer of information rather than dedicated channels, specifically adapted to one form of market, participant, execution model, risk management model, or user interface. This facilitates a method and system for creating user defined marketplace and/or conversation order books to create a hybrid market.

Referring now to the Figures, in which like reference numerals represent like parts, various embodiments of the computing devices and methods will be disclosed in detail. FIG. 1 is a block diagram illustrating one example of a computing device 100 suitable for use in generating and operating a hybrid market and user-defined marketplace.

FIG. 1 illustrates a representative computing device 100 that may be used to implement the teachings of the instant disclosure. The device 100 may be used to implement, for example, one or more components of the system shown in FIG. 2, as described in greater detail below. The device 100 includes one or more processors 102 operatively connected to a storage component 104. The storage component 104, in turn, includes stored executable instructions 116 and data 118. In an embodiment, the processor(s) 102 may include one or more of a microprocessor, microcontroller, digital signal processor, co-processor or the like or combinations thereof capable of executing the stored instructions 116 and operating upon the stored data 118. Likewise, the storage component 104 may include one or more devices such as volatile or nonvolatile memory including but not limited to random access memory (RAM) or read only memory (ROM). Further still, the storage component 104 may be embodied in a variety of forms, such as a hard drive, optical disc drive, floppy disc drive, flash memory, etc. Processor and storage arrangements of the types illustrated in FIG. 1 are well known to those having ordinary skill in the art. In one embodiment, the processing techniques described herein are implemented as a combination of executable instructions and data within the storage component 104.

As shown, the computing device 100 may include one or more user input devices 106, a display 108, a peripheral interface 110, other output devices 112, and a network interface 114 in communication with the processor(s) 102. The user input device 106 may include any mechanism for providing user input to the processor(s) 102. For example, the user input device 106 may include a keyboard, a mouse, a touch screen, microphone and suitable voice recognition application, or any other means whereby a user of the device 100 may provide input data to the processor(s) 102. The display 108 may include any conventional display mechanism such as a cathode ray tube (CRT), flat panel display, or any other display mechanism known to those having ordinary skill in the art. In an embodiment, the display 108, in conjunction with suitable stored instructions 116, may be used to implement a graphical user interface. Implementation of a graphical user interface in this manner is well known to those having ordinary skill in the art. The peripheral interface 110 may include the hardware, firmware and/or software necessary for communication with various peripheral devices, such as media drives (e.g., magnetic disk or optical disk drives), other processing devices, or any other input source used in connection with the instant techniques. Likewise, the other output device(s) 112 may optionally include similar media drive mechanisms, other processing devices, or other output destinations capable of providing information to a user of the device 100, such as speakers, LEDs, tactile outputs, etc. Finally, the network interface 114 may include hardware, firmware, and/or software that allows the processor(s) 102 to communicate with other devices via wired or wireless networks, whether local or wide area, private or public, as known in the art. For example, such networks may include the World Wide Web or Internet, or private enterprise networks, as known in the art.

While the computing device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 100 may include a greater or lesser number of components than those illustrated. Once again, those of ordinary skill in the art will appreciate the wide number of variations that may be used is this manner. Further still, although a single computing device 100 is illustrated in FIG. 1, it is understood that a combination of such computing devices may be configured to operate in conjunction (for example, using known networking techniques) to implement the teachings of the instant disclosure.

Figure 2:
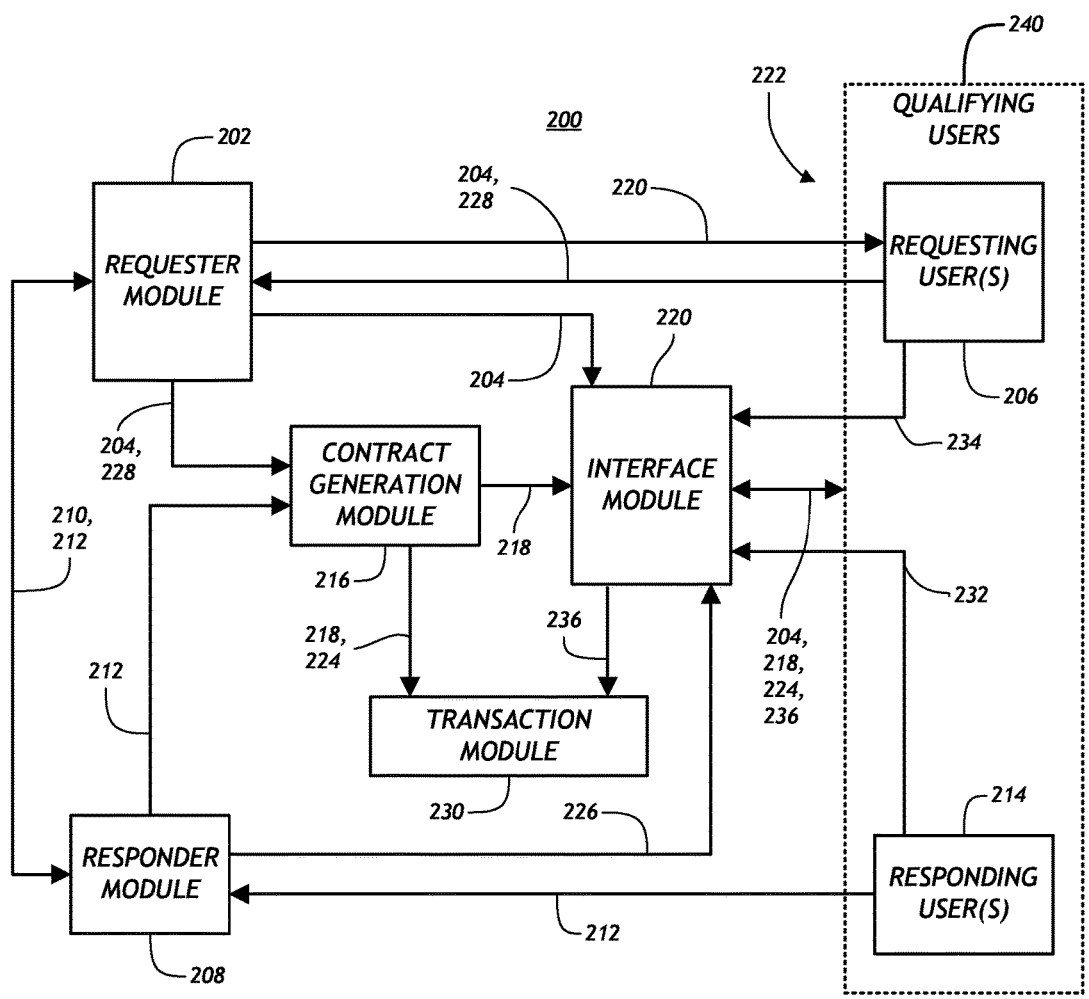
FIG. 2 is a block diagram illustrating one example of a system suitable for generating and operating hybrid markets and user-defined marketplaces, in accordance with the instant disclosure.

FIG. 2 is a block diagram illustrating one example of a system for generating and operating hybrid markets and user-defined marketplaces. The system 200 includes a requester module 202, a responder module 208, a contract-generating module 216, an interface module 220, and a transaction module 230. The requester module 202 is operatively connected to the responder module 208, the contract-generating module 216, and the interface module 220. The responder module 208 is operatively connected to the requester module 202, the contract-generating module 216, and the interface module 220. The contract-generating module 216 is operatively connected to the requester module 202, the responder module 208, the interface module 220, and the transaction module 230. The interface module 220 is operatively connected to all of the other modules.

The system 200 is operatively connected to a plurality of users 222. One or more of the plurality of users 222 are requesting users 206. One or more of the plurality of users 222 are responding users 208. One or more of the users 222 are qualified users 240.

In operation, the requester module 202 obtains RFQ information 204 from one or more requesting users 206. The RFQ information 204 may include, for example, terms of a request for quotation. Specifically, the terms may relate to proposed or potential contracts to trade financial instruments. The terms may include, but are not limited to: the type of financial instrument to trade; the time and date to execute the trade; a price, an offer, or a bid; a quantity, size, or volume; acceptable counterparties; a method of payment; terms of settlement; margin requirements; and/or clearing requirements.

After obtaining the RFQ information 204, the requester module 202 communicates the RFQ information 204 to the interface module 220. The interface module 220 in turn communicates the RFQ information 204 to all qualified users 240. Techniques for inter-module communication and module-user communication are well known in the art, and any suitable communication technique or techniques may be employed herein. Qualified users 240 are those users that meet the criteria, if any, included in the RFQ information 204.

After the RFQ information 204 is displayed, (e.g. through a graphical user interface (GUI), or any other means known to those skilled in the art) the responder module 208 obtains response information 212 from one or more responding users 214. The response information 212 responds to the terms of the request for quote in the RFQ information 204.

In one embodiment, the response information 212 may either accept each term in RFQ information 214 or propose to modify the term. In this embodiment, the responder module 208 relays the response information 212 to the requester module 202 and the interface module 220. The requester module 202 evaluates the response information 212. If all the terms from the RFQ information 204 are accepted, the contract generation module 216 will generate a contract to trade financial instruments 218 and a trade order 224. The trade order 224 is for a quantity specified in the response information 212 and meets the terms of the contract to trade financial instruments 218. The contract generation module 216 communicates the contract to trade financial instruments 218 and the trade order 224 to the interface module 220 and the transaction module 230. The transaction module 230 executes the trade or trades associate with the trade order 224. The interface module 220 communicates the contract to trade financial instruments 218 and the trade order 224 to all qualified users 240. If the trade order 224 does not completely fill the contract to trade financial instruments 218, qualified users 240 may place additional orders 236 against the open contract to trade financial instruments 218. The interface module 220 communicates the additional orders 226 to the transaction module 230, which executes them. The process continues until the entire contract quantity is filled or the contract expires.

The original responding user 214 may also place additional orders 232 against the contract to trade financial instruments 218. As noted above, multiple contracts to trade financial instruments may be open at the same time. If there are multiple requesting users 206, they may also place orders 235 against other requesting users' contracts to trade financial instruments 218.

If the response information 212 includes proposed changes, the requester module 202 will communicate the proposed changes 212 to the requesting user 206. The requesting user 206 may accept the changes 228 or counter-offer with new RFQ information 204 (restarting the process). If the requesting user 206 accepts the changes 228, the contract generation module 216 will generate a contract to trade financial instruments 218 and a trade order 224 based on the modified terms in the response information 212. The process then continues as above.

In another embodiment, the responding user 214 can only accept the terms in the RFQ information 204. In this embodiment, the responding user 214 cannot propose modifications. In this embodiment, an open contract to trade financial instruments 218 is generated after the RFQ information 204 is obtained by the requester module 202, without any substantive delay. The contract to trade financial instruments 218 based on the RFQ information 204 is also displayed by the interface module 220 without any substantive delay. All qualified users 240 may then place orders 236 against the contract to trade financial instruments 218. This embodiment functions as a Central Limit Order Book, which is activated as soon as the requester module 202 obtains the RFQ information 204. The Central Limit Order Book remains active until the contract expires or its quantity is filled, then closes.

In both embodiments, the interface module 220 displays contracts to trade financial instruments 218 and trade orders 224 in order of priority. The priority is based on the volume and recency of trade orders 224, 236 in the contract, and by the proximity of resting orders to current market price. A contract activating a Central Limit Order Book may be a resting order. A resting order is a predefined set of terms for contracts to trade financial instruments and associated instructions to automatically execute one or more trades if a contract to trade financial instruments meets the predefined terms. If the contract/resting order which activates the Central Limit Order Book meets the terms of another pre-existing resting order, the transaction module 230 will automatically match the resting orders and executed the trades for the common quantities. If the either contract/resting order is filled, or both, that Central Limit Order Book is closed.

Figure 3:
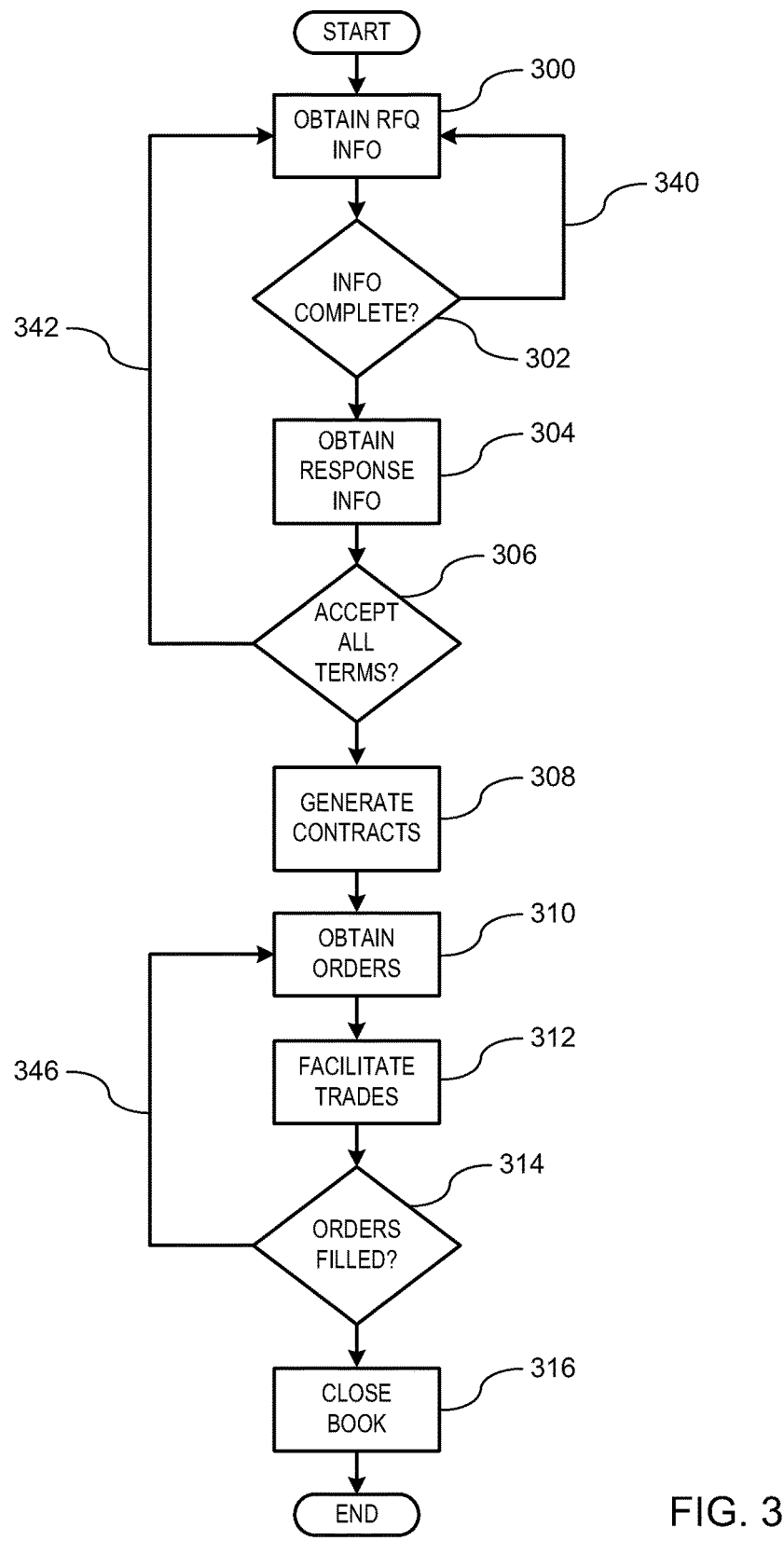
FIG. 3 is a flow chart illustrating one example of a method suitable for generating and operating hybrid markets and user-defined marketplaces, in accordance with the instant disclosure.

FIG. 3 is a flow chart illustrating one example of a method for generating and operating hybrid markets and user-defined marketplaces. At step 300, RFQ information is obtained. At step 302, the RFQ information is checked for completeness. Depending on the type of financial instrument to be traded, the terms required for a request may vary. For some financial instruments, some terms may be optional. This step checks the terms provided in the RFQ information against predetermined minimum terms for that financial instrument. If the RFQ information meets the minimum term requirements, the terms will be communicated, via an interface, to qualified users. If the RFQ information does not meet the minimum, the requesting user will be prompted 340 to provide the missing information.

At step 304, response information is obtained. In one embodiment, the response information may be limited to accepting the terms of the request. In another embodiment, the response information may comprise either an acceptance or proposed modifications to the terms of the RFQ information. At step 306, If all terms are accepted, the method proceeds. If modifications are proposed, they will be communicated 342 to the requesting user. At step 300, the requesting user may accept the proposed modifications to the terms or counter with new terms, restarting the process.

At step 308, a contract is generated based on the accepted terms and communicated to all qualified users via an interface. At step 310, the interface obtains orders for the contract. At step 312, the orders are executed. At step 314, the current orders are compared to the contract quantity. If the contract is filled, the Central Limit Order Book is closed 316. If not 346, the interface continues to obtain orders.

Exemplary Embodiments

A number for exemplary embodiments of the disclosure are provided below. These exemplary embodiments are intended to be illustrative only, and not to limit the scope of the disclosure in any way.

Hybrid Markets

As noted above, being a designated contract market (DCM) has many advantages, including margin requirements and clearing, particularly in the current regulatory environement. In one embodiment, the teachings of the present disclosure mimic the regulatory advantages of a DCM by creating a conversational order book in OTC markets to create a hybrid market to bring liquidity from OTC participants into a central limit order book (CLOB).

Real interest from a participant activates a contract, thereby drawing attention to the activated contract, so that other users may participate. In the hybrid market thus created, requests for quote (RFQs) are used to activate a CLOB for a designated contract.

In this exemplary embodiment, the hybrid market has three types of participants: requester, responders, and the crowd (i.e. all other users). A requester initiates request for quote (RFQ) for one of the designated contracts, responders respond with streaming quotes, and the crowd can observe or participate in the order book. The order book can also be activated by anyone placing a resting order. A resting order is a predefined set of terms for contracts to trade financial instruments and associated instructions to automatically execute one or more trades if a contract to trade financial instruments meets the predefined terms. The life of the central limit order book will be as long as the life of a contract.

The GUI design allows participants to visualize liquidity and action in an active contract. The screen real estate is prioritized by level and age of activity in a contract. Live RFQs have the highest priority, followed by the proximity of resting orders to the current market price, followed by the recency of the activity was. Potential variations include whether quotes from a responder are seen only by the requester, by the crowd, or by select qualified users (a subset of the crowd). Liquidity providers can observe and participate in an active order book as well as activate a contract. The GUI thus addresses the problem of getting participants to pay attention to thousands of contracts in a GUI.

User-Defined Marketplaces

Markets and their structure are defined by a number of structural attributes. Example of structural attributes include: (1) the number and relationships all the network (market) participants; (2) the role of each participant (price maker, price taker, intermediary, prime broker, principal broker, risk-free principal, agency broker); (3) the execution model (VWAP, TWAP, etc.); (4) risk management model (straight through, cover trading, internalization); (5) user interface (desktop, mobile, API, click and trade, orders); and others.

The exemplary system disclosed herein is operative to configure any combination of structural attributes to facilitate the construction of unique marketplaces/exchanges.

Examples of such user-configured marketplaces include:

Agency Execution System:

An agency broker executes a trade on behalf of a client for a predetermined commission. The agency broker is bound by a fiduciary relationship and cannot act as the client's counterparty in the trade. In one embodiment, this exemplary user-defined market incorporates the following attributes: dealer aggregated liquidity, straight through execution, VWAP price discovery and execution model, full book display to user, disclosed liquidity.

Market Maker:

A market maker is a liquidity provider who "makes" a market by offering to buy or sell, at different prices (i.e. spread), from/to any counterparty. In one embodiment, this exemplary user-defined market incorporates the following attributes: dealer, electronic communication network (ECN), PT aggregated liquidity, internalized execution up to limit warehouse levels, laddered price discovery, FOK with 5 second fill time. Undisclosed liquidity.

Matrix:

A matrix is an OTC facility where some parties are only know to other counterparties through a unique and unchanging tag. In one embodiment, this exemplary user-defined market incorporates the following attributes: dealer, PT aggregated liquidity, straight through execution, full book aggregated price discovery, swap execution, user selected liquidity sources. LP selected client specific pricing/streams, pseudonyms (reciprocal tagged id for clients and liquidity providers).

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. For example, one skilled in the art will recognize that executable instructions may be stored on a non-transient, computer-readable storage medium, such that when executed by one or more processors, causes the one or more processors to implement the method described above.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments of this technology are described above with reference to block and flow diagrams of computing devices and methods and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments of this disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for facilitating trading of financial instruments, comprising:
   a requester module that is executable via a processor and configured to:
      obtain request for quotation (RFQ) information comprising terms of a request for quotation and a market role associated with the one or more requesting users,
      construct a hybrid over-the-counter (OTC) market that includes an adaptable channel for facilitating transfer of the RFQ information among one or more requesting users via a network based on structural attributes, wherein the structural attributes include the market role, and
      activate a central limit order book for the OTC market based on the RFQ information;

a responder module that is executable via the processor and operatively connected to the requester module, the responder module configured to obtain response information from one or more responding users via the network, wherein the response information includes modification of one of more of the defined terms of the RFQ information;

a contract generation module that is executable via the processor and operatively connected to the requester module and the responder module, wherein the contract generation module is configured to generate contracts to trade financial instruments based on the RFQ information and the response information;

an interface module that is executable via the processor and operatively connected to the requester module, the responder module, and the contract generation model, wherein the interface module is configured to:

obtain order information, based on the contracts to trade financial instruments, from one or more qualifying users via the network, and specify whether to communicate the RFQ information only to a first requesting user included in the one or more requesting users, only to the one or more qualifying users who meet criteria specified by the RFQ information, or to all other users; and a transaction module that is executable via the processor and configured to execute trades based on the contracts to trade financial instruments.

2. The system of claim 1, wherein the response information further includes acceptance of one of more of the defined terms of the RFQ information.

3. The system of claim 1, wherein the interface module is further configured to generate display data comprising at least one of:
    RFQ information,
    response information, and
    contracts to trade financial instruments.

4. The system of claim 3, wherein the interface module is further configured to communicate to one or more qualifying users the generated display data for contracts to trade financial instruments meeting criteria specified the one or more qualifying users.

5. The system of claim 3, wherein the display data is organized in order of priority, wherein priority is based on:
    volume of activity in the one or more contract to trade financial instruments; and
    recency of activity in the one or more contract to trade financial instruments.

6. The system of claim 1, wherein the RFQ information defines at least one of:
    qualifying users comprising users permitted to participate in the contract to trade financial instruments;
    responding users comprising users permitted to respond to the RFQ information;
    types of orders permitted;
    a method of payment;
    terms of settlement;
    margin requirements; and
    clearing requirements.

7. The system of claim 6, wherein the RFQ information further defines which of the one or more qualifying users are permitted to observe:
    response information arising from the requesting user's RFQ information, and contracts to trade financial instruments arising from the requesting user's RFQ information.

8. The system of claim 1, wherein the requester module is further configured to obtain from the requesting user at least one of:
    an acceptance of the modification of one of more of the defined terms of the RFQ information;
    a rejection of the modification of one of more of the defined terms of the RFQ information; and
    new RFQ information based on the response information.

9. The system of claim 1, wherein the interface module is further configured to obtain one or more resting orders from any user, wherein the one or more resting orders each comprise:
    a predefined set of terms for contracts to trade financial instruments; and instructions to automatically execute one or more trades if a contract to trade financial instruments meets the predefined terms.

10. The system of claim 9, wherein the central limit order book comprises a transparent, contemporaneous, and anonymous database of all orders associated with the contract to trade financial instruments.

11. The system of claim 10, wherein the central limit order book closes when at least one of the following occurs:
    the contract to trade financial instruments associated with the resting order is filled; and
    the contract to trade financial instruments associated with the resting order expires.

12. The system of claim 1, wherein the contract generation module is further configured to impose margin and clearing requirements equivalent to a Designated Contract Market.

13. The system of claim 1, wherein the financial instruments comprise non-deliverable forwards.

14. The system of claim 1, wherein the requester module is further configured to obtain RFQ information at any time and on any date and wherein the interface module is further configured to obtain order information at any time and on any date.

15. The system of claim 1, wherein the RFQ information further comprises market roles of the responding users.

16. The system of claim 1, wherein the one or more requesting users, the one or more responding users, and the one or more qualifying users may perform at least one of the following market roles:
    market maker;
    market taker;
    intermediary;
    prime broker;
    principal broker;
    risk-free principal; and
    agency broker.

* * * * *

UNITED STATES PATENT AND TRADEMARK OFFICE
CERTIFICATE OF CORRECTION

PATENT NO. : 9,836,789 B2
APPLICATION NO. : 14/214159
DATED : December 5, 2017
INVENTOR(S) : Vikas Srivastava, Patrick Barkhordarian and Harpal Sandhu Page 1 of 1

It is certified that error appears in the above-identified patent and that said Letters Patent is hereby corrected as shown below:

On the Title Page

(57) Abstract:
Line 13, please delete "(iii)" and insert --(iv)--;
Line 18, please delete "(iv)" and insert --(v)--.

Signed and Sealed this
Thirteenth Day of March, 2018

Andrei Iancu
*Director of the United States Patent and Trademark Office*